| United States Patent [19] | [11] 3,914,985 |
|---|---|
| von Behrens | [45] Oct. 28, 1975 |

[54] CENTRIFUGING DEVICE AND METHOD

[75] Inventor: Wieland E. von Behrens, Seattle, Wash.

[73] Assignee: American Hospital Supply Corporation, Evanston, Ill.

[22] Filed: Mar. 29, 1974

[21] Appl. No.: 456,169

[52] U.S. Cl. .............................. 73/61.4; 23/230 B
[51] Int. Cl.² ......................................... G01N 15/06
[58] Field of Search ................. 73/61 R, 61.4, 64.1; 233/26; 215/10, DIG. 3; 128/2 G; 23/230 B, 23/258.5, 292

[56] References Cited
UNITED STATES PATENTS

| 2,817,970 | 12/1957 | Whitby | 73/61.4 X |
| 3,170,838 | 2/1965 | Archer | 233/26 UX |
| 3,291,693 | 12/1966 | Brown | 73/61 R |
| 3,513,976 | 5/1970 | James | 233/26 X |
| 3,750,645 | 8/1973 | Bennett et al. | 128/2 G |

Primary Examiner—Richard C. Queisser
Assistant Examiner—Joseph W. Roskos
Attorney, Agent, or Firm—Dawson, Tilton, Fallon & Lungmus

[57] ABSTRACT

A device and method for harvesting, compacting and measuring particulate matter, especially cellular matter, suspended in liquids such as blood and other body fluids. The device comprises an outer tube which is closed at its lower end and which contains a removable inner tube, the latter having an upper section defining an enlarged chamber and having a transparent lower section provided with a capillary passage communicating with the chamber. After an initial centrifuging operation in which particulate matter to be measured has collected in the capillary passage, the inner tube is removed and the lower capillary section is separated and is thereafter re-centrifuged at higher speed to compact for optical volumetric measurement the particulate matter under investigation. In one embodiment, the lower end of the capillary tube is open and communicates directly with the interior of the outer tube so that during initial centrifugation an equilibrating flow of liquid and particulates takes place to displace from the inner tube substantially all but the uppermost strata of particulates. Variations in operation and in structure for supporting the inner tube within the outer tube are also disclosed.

19 Claims, 14 Drawing Figures

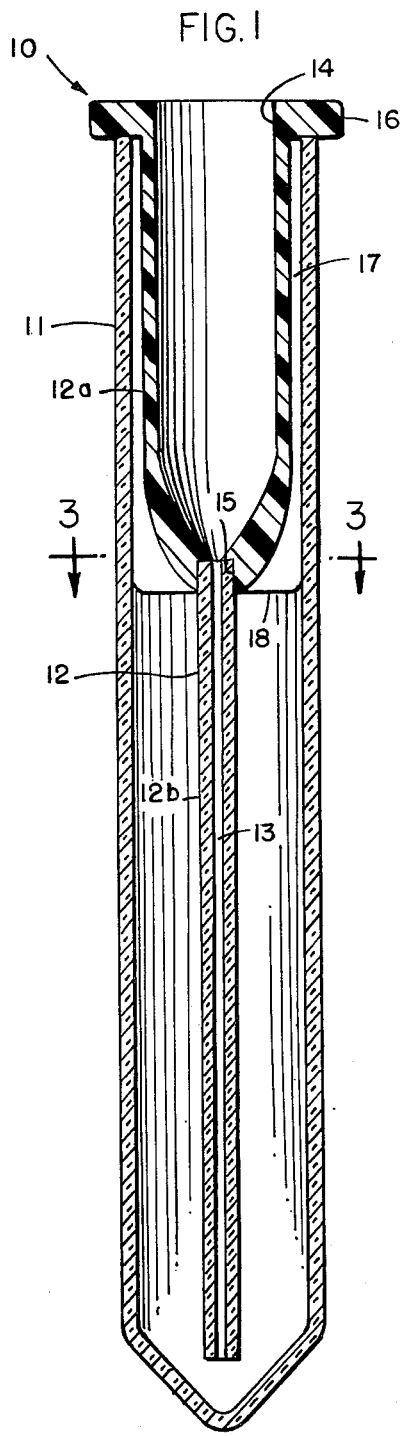
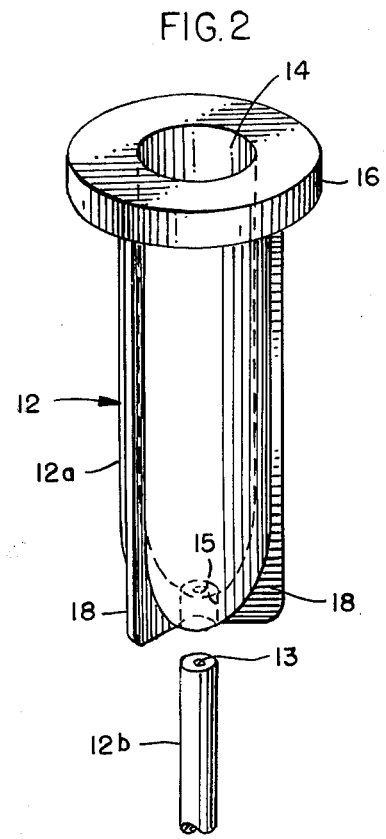
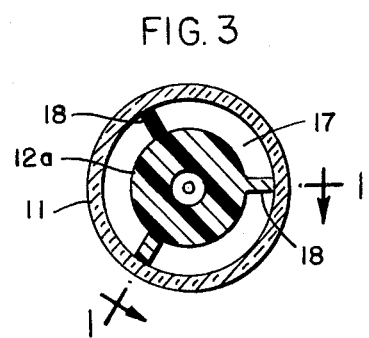

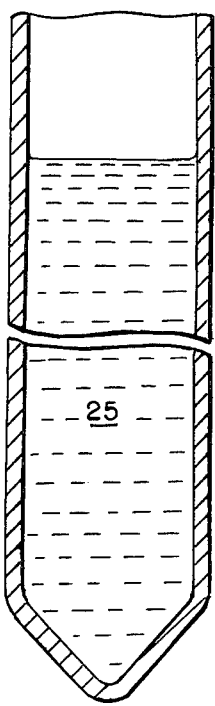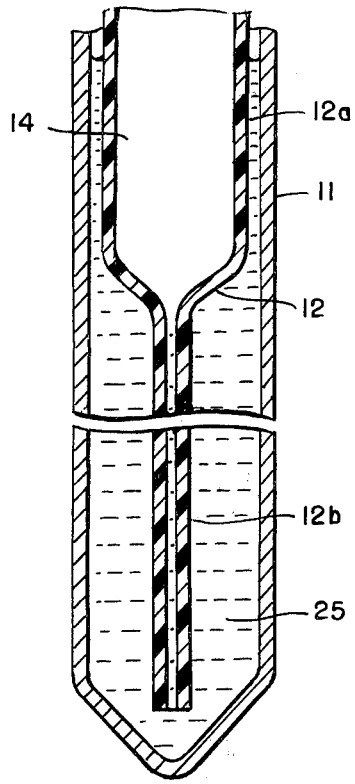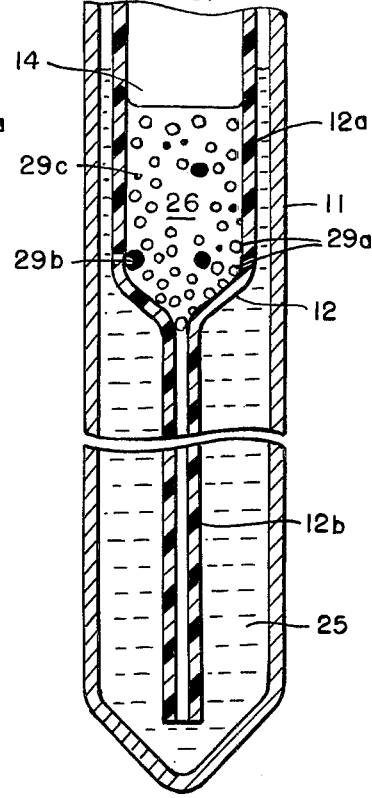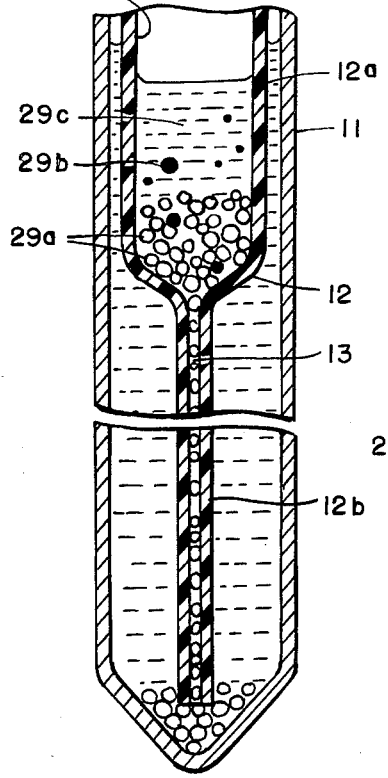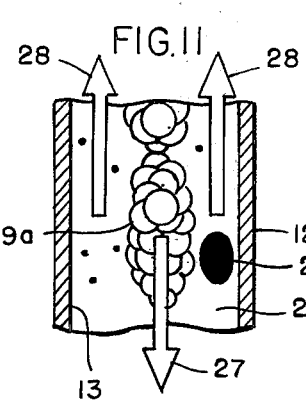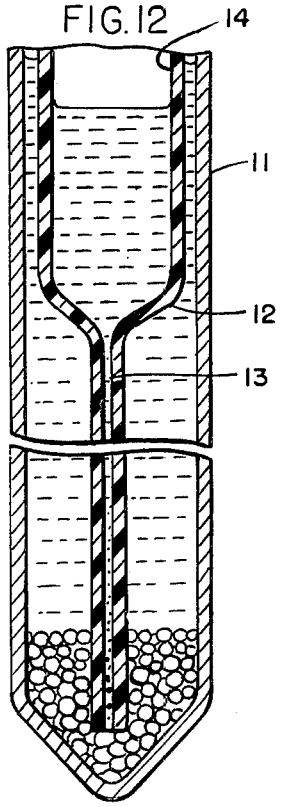

CENTRIFUGING DEVICE AND METHOD

BACKGROUND

The biological and clinical significance of cell volumes in body fluids was perhaps first recognized in studies of red cell (erythrocyte) volumes in whole blood and the introduction of microhematocrit methods for determining the packed red cell volume (i.e., the hematocrit) has resulted in simplication and standardization of such measurements. After a sample of whole blood is centrifuged in accordance with the microhematocrit technique, the proportional length of the packed red cell sdiement in the capillary tube, compared with the total length of the contents of that tube, is a direct measure of the percentage of the blood occupied by erythrocytes. This direct measure also allows indirect computation of the mean cell volume of the individual erythrocytes (and of other clinically important red cell indices in conjunction with a hemoglobin estimation) from a knowledge of the readily determined cell count per unit volume of blood. In such studies it has been established that each of these red cell parameters — i.e., hematocrit (count times volume), count, mean volume, and indices — shows only narrow variations within the species of main in health as opposed to disease. By contrast the red cell count and the mean red cell volume of different healthy vertebrate species can vary enormously when considered as isolated measurements; but their product, the hematocrit, is remarkably stable even between different species. This indicates that the circulating cell biomass rather than the number of cells or the average size of the cells has the greatest biological importance.

Until now no technique comparable to the microhematocrit technique in simplicity and reliability has been developed for estimating the packed volume of other cellular components of blood, namely, platelets (thrombocytes) and white cells (lymphocytes and granulocytes). And since no practical methods have been available for measuring the average volumes of the individual cells directly, heavy reliance has been placed on the cell count in the clinical assessment of platelets and white cells. Whether that is a sound approach for white cell subpopulations has not yet been determined since insufficient evidence is available concerning variations in mean cell volume in health and disease. At least with respect to platelets, however, it has now been clearly established that the platelet count is not an adequate index of the biologically important circulating platelet mass or total volume. See W. E. von Behrens, "Evidence of Phylogenetic Canalisation of the Circulating Platelet Mass in Man," Thrombosis et Diathesis Haemorrhagica, Vol. 27, pp. 159–170 (1972). The reason is that the mean cell volume of platelets can vary by a factor of at least eight on a genetic basis not only between different species, like mean red cell volume can, but also between different human beings. Hence, a platelet count in any species should be interpreted in the context of a platelet volume measurement; or the packed platelet volume should be estimated directly. Unfortunately the only methods so far developed for estimating either of these parameters are at best tentative; they are complicated, time consuming, expensive, and far from being standardized or accepted.

Efforts have been made to utilize standard microhematocrit tubes, and to magnify optically the buffy coat at the plasma-cell junction, to estimate the total volume percent of platelets and other minor cellular constituents of blood, but such efforts have been generally unsuccessful because the thrombocytocrit, lymphocytocrit and granulocytocrit are each normally well below 0.5 percent of mammalian whole blood an therefore defy clear detection and accurate measurement. See J. W. Rebuck, et al., "Volumetric and Ultrastructural Studies of Abnormal Platelets", *Blood Platelets*, Eds. S. A. Johnson et al., 533–552 (Littlem Brown and Co., 1961). Despite the desirability of obtaining volume percent measurements of thrombocytes, lymphocytes, and granulocytes, no simple and effective means for making such measurements has heretofore been developed.

SUMMARY

This invention is concerned with an inexpensive and uncomplicated method and device for quickly and accurately measuring the packed mass (volume percent) of minor constituents of fluids, particularly whole blood, platelet-rich plasma, and other body fluids. The invention is particularly useful in hematology for determining the packed cell volume of platelets (thrombocytes), lymphocytes, and granulocytes, and will therefore be described in that context, although it is to be understood that the method and device may also be applicable for measuring particulates in cerebrospinal fluid, urine, and other liquids.

In brief, the device comprises an open-topped outer centrifuge tube, closed at its bottom end, and an inner tube removably supported therein. The inner tube has an upper section defining an enlarged chamber and a lower section with a capillary passage communicating with that chamber. The lower capillary section is transparent, has a constant bore, and is separable (either by disconnection or fracture) from the upper section when the inner tube has been removed from the protective outer centrifuge tube.

For some purposes it has been found desirable to seal the capillary section at its lower end so that the chambers of the inner and outer tubes are not in direct flow communication. In a preferred form, however, especially useful in measuring minor cytocrits of whole blood, the lower end of the capillary section is in open communication with the interior of the outer centrifuge tube. During initial low-speed centrifugation, an equilibrating interflow occurs between the cell-free liquid within the outer tube and the blood or other fluid within the inner tube. The more readily sedimented cellular components of the blood migrate from the enlarged chamber of the inner tube down through the capillary passage and into the lower portion of the outer tube. When an equilibrium condition is developed, most of the erythrocytes are displaced from the inner tube with cell-free liquid remaining in the enlarged upper chamber of the inner tube and with those cellular components more resistant to this form of sedimentation (thrombocytes, lymphocytes, and granulocytes) residing in the capillary passage. Thereafter, centrifugation is interrupted, the inner tube is removed from the outer centrifuge tube, and the capillary section is disconnected or broken away from the inner tube's enlarged upper section. The lower end of the separated capillary section is sealed and the capillary tube is then subjected to high-speed centrifugation in accordance with normal hematocrit procedures. The platelet and leucocyte layers are thereby compacted to constant volume and, following such centrifugation, are measured to determine the packed cell mass of each cellular component.

It has been found that the relatively fragile inner tube is capable of withstanding the forces developed during initial centrifugation because of the protective supporting or cushioning effect of the liquid which is disposed within the outer tube and which surrounds the inner tube. Additional protection may take the form of an insert disposed at the lower end of the outer tube which braces the bottom of the capillary tube section against lateral displacement without at the same time interfering with flow from (and into) the open lower end of the capillary passage. In the best mode presently known for practicing the invention, the upper section of the inner tube cooperates with the outer tube to suspend the former within the latter. Specifically, the upper section is provided with a flange which rests upon the mouth of the outer tube to support the inner tube in proper position and, in certain applications, to seal the outer tube's upper end. Below the flange, the enlarged upper section of the inner tube has an outside diameter substantially smaller than the inside diameter of the outer tube. Ribs project radially from the inner tube's upper section and engage the inside surface of the outer tube for frictionally holding the inner tube against independent lateral movement without at the same time blocking the flow of liquid about the inner tube's upper section.

Other advantages and objects of the invention will become apparent from the drawings and detailed description.

DRAWINGS

FIG. 1 is an enlarged longitudinal sectional view illustrating a plural-chambered centrifuging device embodying the invention.

FIG. 2 is an enlarged fragmentary and exploded perspective view illustrating the construction of the inner tube assembly.

FIG. 3 is a transverse sectional view taken along line 3—3 of FIG. 1.

FIGS. 7–12 are simplified and schematic fragmentary sectional views illustrating the sequence of steps through initial centrifugation, of the method of this invention in which the inner and outer tubes are in open communication, FIG. 11 being a greatly enlarged fragmentary and schematic sectional view showing the flow relationships within the capillary passage during initial centrifugation.

DETAILED DESCRIPTION

Figure 4:
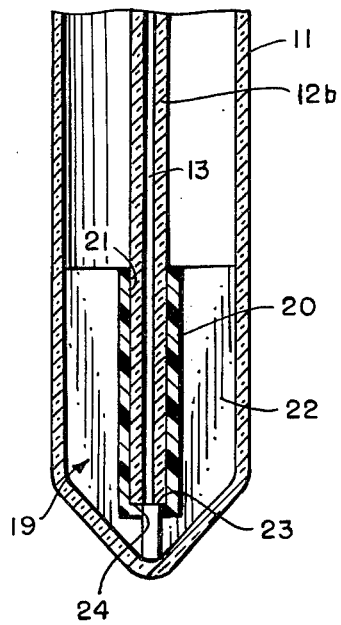
FIG. 4 is a fragmentary longitudinal sectional view of a device similar to that illustrated in FIG. 1 except for the provision of a supporting insert at the bottom of the outer tube.

REFERRING TO FIGS. 1–3, the numeral 10 generally designates a plural-chambered centrifuge tube assembly comprising an outer tube 11 and an inner tube 12. The outer tube is similar in construction and configuration to a conventional centrifuge tube and is dimensioned to be received within the holders of standard laboratory centrifuges. As shown, the tube is open at its upper end, closed (and preferably tapered) at its lower end, and of uniform diameter substantially throughout its full longitudinal extent. It may be formed of plastic, metal, or any material having the desired propeties of strength and rigidity, although glass has been found particularly effective for that purpose.

The inner tube 12 is removaly disposed within the outer tube and is composed of an upper section 12a and a lower section 12b. The lower section takes the form of a transparent capillary tube havng a capillary passage or bore 13 of uniform predetermined dimensions. The length of the capillary tube section 12b and the capacity of the capillary passage may vary considerably depending on the particular use for which the assembly 10 is intended. For hematological purposes, and especially for thrombocytocrit, lymphocytocrit, and granulocytocrit determinations, the lower section should have a length falling within the range of 20 to 100 millimeters, approximately 50 to 80 millimeters being preferred, and the capillary passage should have a volumetric capacity within the range of 0.5 to 100 cubic millimeters, preferably 10 to 50 cubic millimeters. While precise dimensional control is most readily achieved if the capillary section 12b is formed of glass, other transparent materials such as rigid plastics might conceivably be used.

The upper section 12a is provided with an enlarged chamber 14 extending downwardly from the tube's open upper end. The two sections are securely joined togeter with the upper end of capillary passage 13 communicating directly with the lower end of chamber 14. In the illustration given, the upper section is provided with a downwardly facing socket or recess 15 which tightly receives the upper end portion of the capillary tube section. It will be observed that the wall defining the lower portion of chamber 14 slopes gradually inwardly to provide a smoothly tapered transition between the relatively large cross section of the chamber 14 and the small dimensions of capillary passage 13.

The upper section 12a is generally cylindrical in configuration and, except for top flange 16, has an outside diameter substantially smaller than the inside diameter of outer tube 11. As a result, a space 17 is provided between the upper section of the inner tube and the opposing inner surface of the outer tube. a plurality of longitudinal ribs are formed as an integral part of the upper section and frictionally engage the inner surface of outer tube 11 without obstructing the longitudinal flow of fluid within the segments of space 17.

In the embodiment illustrated in FIGS. 1–3, the means for supporting the inner tube within the outer tube includes flange 16 which is formed integrally with upper section 12a and which rests upon the upper end of tube 11. The flange thus performs the dual functions of suspending the inner tube 12 within the outer tube 11 and of sealing space 17 at the upper end of the assembly. Since the lower capillary tube section 12b is relatively fragile, at least where glass is used in its fabrication, the supporting means may also include an insert 19 illustrated in FIGS. 4 and 5. While the insert performs an important function in preventing flexure and possible brakage of the capillary tube section 12b during handling of the assembly or during rapid acceleration or deceleration in the centrifuging process, the particular insert shown in the drawings also limits the extent of downward movement of the inner tube 12 within the outer tube 11. To that extent, it performs a function similar to that of flange 16 and, if desired, may constitute the sole means for supporting the inner tube against downward axial displacement within the outer tube. Stated differently, in the best mode presently known for practicing the invention, the inner tube 12 is supported axially both by upper flange 16 and by insert 19 but it is to be understood that the supportive function may be performed entirely by one or the other.

Insert 19 may be formed of plastic or any other suitable material and includes a body portion 20 having a cylindrical recess or socket 21 receiving the lower end portion of capillary tube section 12b. Integral vanes or ribs 22 extend radially and longitudinally to engage the inside surfaces at the lower end of outer tube 11. It will be noted that recess 21 terminates at its lower end in a shoulder 23 spaced above the lower limits of outer tube 11. The shoulder is engaged by the bottom end of capillary tube section 12b (at least in those applications where the insert is intended to limit the extent of downward movement of the inner tube assembly 12) and an opening 24 of larger diameter than capillary passage 13 extends through the lower end of body 20.

While the upper and lower sections of the inner tube might be integrally formed, it is believed more effective to fabricate each section 12a and 12b separately and thereafter join them together as shown. Such a construction permits different materials to be used for the upper and lower sections. As already mentioned, the lower capillary section 12b is preferably formed of glass. The upper section 12a may be fabricated from any of a variety of materials, although plastics are believed particularly effective because even rigid plastic materials have sufficient resilience to permit a snug frictional engagement between ribs 18 and the wall of outer tube 11 without any appreciable risk of damage to the parts.

The upper end of capillary tube section 12b may be cemented or otherwise permanently secured within socket 15. Alternatively, the two sections may be held together simply by a tight frictional interfit. In either case, it is essential that the two sections be separable at will, either by fracturing or cutting the capillary section at its junction with the upper section, or by extracting the upper end of the capillary sectin from its socket or other holding means.

Figure 6:
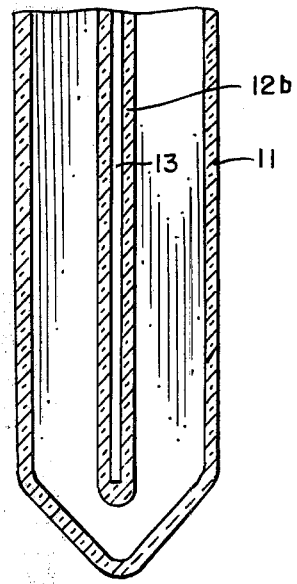
FIG. 6 illustrates a modification of the structure of FIGS. 1–3 wherein the lower end of the capillary tube is closed.
Figure 5:
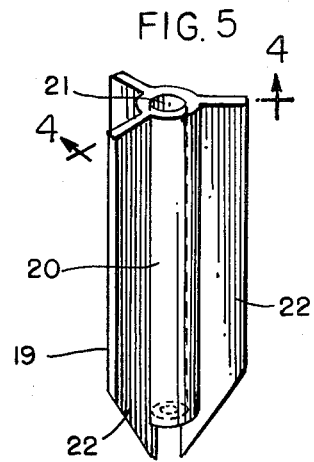
FIG. 5 is a perspective view of the insert shown in FIG. 4.
Figure 14:
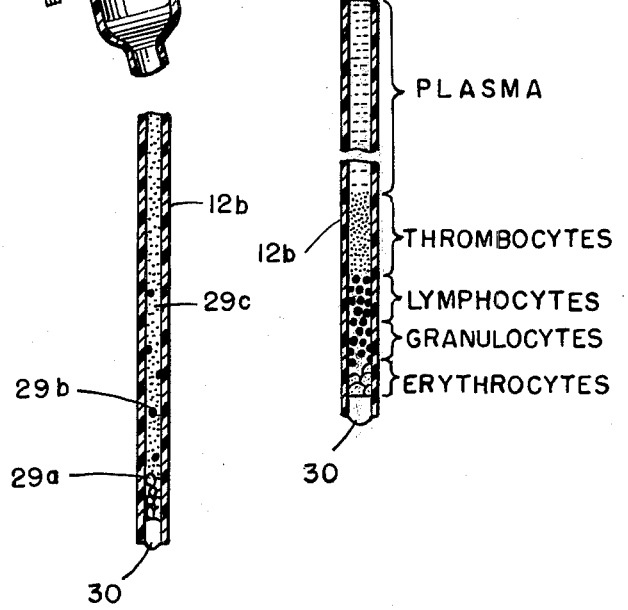
FIG. 14 is a schematic longitudinal sectional view of the capillary section of the transparent capillary tube section following final centrifugation.

In FIGS. 1-4, the capillary section 12b is shown to be open at its lower end. Capillary pasage 13 is therefore in direct communication with the interior of outer tube 11 and, as described hereinafter, an equilibrating counterflow or exchange takes place between the contents of the inner and outer tubes during initial centrifugation. In those instances where such an exchange is not desired, the lower end of the capillary section may be permanently sealed as shown in FIG. 6. The embodiment of FIG. 6 is otherwise identical to the form shown in FIGS. 1-3 and, if desired, the assembly f FIG. 6 may be provided with an insert 19 as shown in FIGS. 4 and 5. As already described, the axial support provided by the insert may be in lieu of, or in addition to, the supportive function of upper flange 16.

The method of this invention, in which an open system is utilized — that is, one in which the chambers of the inner and outer tubes communicate with each other through the capillary tube — is illustrated in FIGS. 7-14. For purposes of illustration, the method will be described in connection with the determination of the packed cell volume or mass of platelets or thrombocytes in a sample of whole blood.

In the first step of the method, a selected quantity of a liquid 25 having a specific gravity similar to that of plasma and, in the case of an open system, one which will serve as an effective diluent for blood, is placed in outer tube 11. Isotonic saline, Ringer's solution, or any other standard diluent may be used. The amount should be sufficient to bring the level of the liquid in the outer tube, and external to the inner tube, well above the lower limits of the inner tube's upper section 12a and preferably near the upper ends of the inner and outer tubes (FIG. 8). thereafter, the inner tube 12 is inserted into the outer tube. Diluent begins to flow upwardly into the capillary passage through the open bottom end thereof to prime that passage and thereby facilitate subsequent operations. A measured amount of anticoagulated whole blood 26, preferably diluted with an equal volume of the same diluent added to the outer tube, is placed in the enlarged chamber 14 of upper section 12a. As shown in FIG. 9, the level of the blood within chamber 14 is no higher than the level of the lighter diluent outside of that chamber, and is preferably a short distance below that level.

The centrifuge tubs assembly 10 is placed in a conventional laboratory centrifuge and is spun at relatively low speed (for example, at a speed developing forces of approximately 3,000 times gravity) until all of the cellular components of the blood have migrated out of the chamber 14 of upper section 12a and into the capillary passage 13 and the lower end of outer tube 11. The action is schematically illustrated in FIGS. 10-12, but it is to be recognized that different phenomena are exploited at the beginning and towards the end of the separation-centrifugation process.

The initial downward migration tendency of all the heavier cellular components is represented by arrow 27. But since the system is not a dilute one the behavior of the particles (under the influence of a gravitational or centrifugal force) does not follow a simple form of Stokes Law in which individual particle size is the dominant factor influencing the rate of downward migration. The effective migrational propensity of the different cell species present in the capillary during the early part of centrifugation is influenced by such factors as particle density, particle shape, cell surface characteristics, vital cell characteristics such as surface charge, fluid characteristics such as the protein composition of the plasma when blood is the sample, and the relative abundance of the different particle species. One well established result of these factors is the tendency for particles such as red cells to form large aggregates with a very high effective Stokes diameter. Microscopic observations now show that in the capillary section these aggregates are linked dynamically to each other with individual red cells undergoing constant translation and rotation within a very large continuous red cell formation moving downwardly in the capillary like a chain.

During this continuous rearrangement of the red cells the platelets and leucocytes which have different associative properties are displaced outwardly. At the same time the downward moving column of red cells displaces an equal mass of particle free fluid from the lower chamber and this fluid moves upward through the capillary to maintain the hydrostatic equilibrium of the system. This countercurrent is indicated by arrows 27 and 28 (FIG. 11) and carries with it the individual and peripherally displaced thrombocytes and leucocytes. Thus, during its passage down the capillary tube the red cell column is winnowed free of the subspecies. To aid in schematically illustrating the process, aggregates of red cells are represented in FIGS. 7–14 in outline form 29a, leucocytes in large solid form 29b, and thrombocytes in small solid form 29c.

When all of the members of the dominant particle species, in this case red cells, have left the upper chamber 14, the phenomena within this chamber and the capillary tube are basically those of an isopycnic centrifugation process analogous to that occurring in a microhematocrit tube; that is, the cell species become stratified on the basis of their individual densities.

The parts of the centrifuge tube assembly are so proportioned, the quantities of diluent and sample are so selected, and the rate of centrifugation is chosen in such a way, that when an equilibrium condition is finally achieved during low-speed centrifugation, chamber 14 will contain only cell-free liquid, the unwanted cells (erythrocytes) will be disposed almost entirely in the lower portion of the tube, and the desired cellular components will be disposed entirely within capillary passage 13 (FIG. 12). When a suitable volume of whole blood is used it is found when an equilibrium condition is reached that the platelets and white cells reside as a white and greywish-brown column respectively in the capillary passage. If inspection shows that not all of the platelets and white cells have left the chamber 14 and have entered the capillary passage, then a small amount of diluent may be added to the inner chamber 14 (to bring the level in that chamber up to the meniscus in the outer chamber), and the assembly may then be recentrifuged for a brief period.

Figure 13:
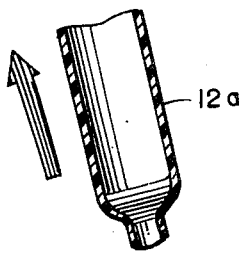
FIG. 13 is a fragmentary and schematic sectional view illustrating a further step in the method wherein the upper and lower sections of the inner tube are separated following initial centrifugation.

Thereafter, centrifugation is interrupted, inner tube 12 is removed from outer tube 11, the lower end of the capillary section 12b is sealed with a flame or with a quantity 30 of standard sealing compound well known for use in sealing the ends of microhematocrit tubes, and the upper and lower sections 12a and 12b are separated from each other at their juncture (either by breaking or by extracting) as illustrated in FIG. 13. Preferably, the length of the separated lower section 12b should approach 75 millimeters, the length of a standard microhematocrit tube. The capillary tube section 12b is then centrifuged at high speed (i.e., at speeds capable of generating force in the order of 12,000 times the force of gravity) in a standard microhematocrit centrifuge. After centrifugation for the standard interval of 5 minutes, the capillary tube is removed and the lengths of the identifiable thrombocyte (platelet), lymphocytes, and granulocyte columns are visually measured either with a ruler or by placing the capillary tube at a specific location on a suitable microhematocrit reader. Such lengths are directly proportional to the respective crits. In fact:

if the capillary diameter D is 0.5 mm [then $(\pi/4)D^2 = 0.19635 \approx 0.20$ mm$^2$] and
if L is the length of a particular cell column in mm [then the volume of packed cells, $v$, is $0.20$ L in (mm)$^3$], and if a volume V of 2 ml whole blood is used,
then the cytocrit in % = 100 v/1000 V
= v/10 V
= 0.2 L/10 V
= 2 L/100 V
= L/100

While it is believed that proportions of the parts may be varied considerably, one example of an effective centrifuge tube assembly for use in performing hemocytocrit determinations as described above comprises an outer tube of 150 to 160 millimeters in length and 15 millimeters in diameter, and an inner tube having a capillary section of 0.5 millimeters inside diameter and a length slightly greater than 75 millimeters. Scoring of the glass capillary tube 75 millimeters from its lower end facilitates breaking of the tube at that point following initial centrifugation. The lower end of the capillary tube section is spaced approximately 2 millimeters from the bottom end of the outer tube and the chamber of the upper section is dimensioned to hold approximately 4 milliliters of fluid when the meniscus is 1 centimeter from the top of that chamber.

Centrifuge tube assemblies for use in measuring the packed volume of particulates in other fluids would be expected to have considerably different dimensions. Furthermore, in those cases where the particulate content is extremely low (cerebrospinal fluid and urine, for examples), the embodiment illustrated in FIG. 6, where the lower end of the capillary tube section is permanently sealed, may be effectively used. The procedures described would be essentially the same except that no transfer between the outer and inner tubes would occur during initial centrifugation. The liquid in the outer tube might be saline, water, or any liquid having a specific gravity approximately that of the liquid within the inner tube. During initial centrifugation, the liquid within the outer tube and surrounding the inner tube serves to cushion and protect the inner tube and its contents. Following initial centrifugation, the inner tube is removed, the capillary section separated from the upper chamber section, and the capillary tube is subjected to high speed centrifugation and subsequent measurement of the packed volumes of its contents, all as previously described.

While in the foregoing I have disclosed embodiments of the invention in considerable detail for purposes of illustration, it will be understood by those skilled in the art that many of these details may be varied without departing from the spirit and scope of the invention.

I claim:

1. A centrifuge tube assembly comprising an open-topped outer tube and an inner tube removably supported therein; said inner tube having an upper section defining an enlarged chamber and a lower section having a capillary passage communication with said chamber; said lower section being transparent and being separable from said upper section when said inner tube is removed from said outer tube; said capillary passage being open at its bottom end and communicating directly with the interior of said outer tube.

2. The tube assembly of claim 1 in which the bottom end portion of said lower capillary section is spaced above the bottom inside surface of said outer tube.

3. The tube assembly of claim 2 in which a tube-supporting element is seated within the lower end of said outer tube; said supporting element having an upwardly facing recess receiving and supporting said bottom end portion of said lower capillary section.

4. The tube assembly of claim 1 in which said upper section is provided with an outwardly projecting flange larger than said outer tube and resting upon the open upper end of said outer tube for supporting said inner tube therein.

5. The tube assembly of claim 1 in which said lower section of said inner tube is formed of glass.

6. The tube assembly of claim 5 in which said upper section of said inner tube is formed of plastic and is provided at its bottom end with a downwardly facing socket receiving the upper end of said lower capillary section.

7. A centrifuge tube assembly comprising an open-topped outer tube and an open-topped inner tube removably supported therein; said inner tube having an upper section defining an enlarged chamber and a lower section having a capillary passage communicating with said chamber; said lower section being transparent and being separable from said upper section when said inner tube is removed from said outer tube; said upper section having a body portion smaller in external diameter than the internal diameter of said outer tube; whereby, liquid in said outer tube may assume a level above the lower limits of said chamber.

8. The tube assembly of claim 7 in which said upper section is provided with a plurality of outwardly extending longitudinal ribs frictionally engaging the inner surface of said outer tube.

9. The tube assembly of claim 8 in which said upper section and said ribs are integrally formed of resilient plastic material.

10. The tube assembly of claim 7 in which said capillary passage is sealed at its bottom end.

11. The tube assembly of claim 7 in which said capillary passage is open at its bottom end and communicates directly with the interior of said outer tube.

12. In a method for determining the packed volumes of suspended microparticles, the steps comprising supporting a liquid containing suspended microparticles in a tube having an enlarged upper chamber and a lower capillary section communicating therewith, supporting said tube in a body of liquid contained in a second outer tube and, while so supported, initially centrifuging said tubes and their contents at relatively low speed to displace said microparticles from said upper chamber into said capillary section, then separating said capillary section from said upper section, and finally recentifuging said separated capillary section and its contents at relatively high speed while the lower end of said capillary section is sealed.

13. The method of claim 12 in which there is the further step of determining the packed volume of said microparticles by measuring the length of such volume of microparticles within said capillary section following final centrifugation.

14. The method of claim 12 in which the lower end of said capillary section is in open communication with said liquid-containing outer tube during said initial centrifugation, said step of initially centrifuging said tubes and their contents being continued until substantially all microparticles except those to be measured have migrated from said capillary section into said liquid-containing outer tube.

15. The method of claim 14 in which there is the further step of sealing the lower end of said capillary section prior to final recentrifuging of said separated capillary section.

16. A method for use in selectively determining the packed cell volumes of cellular components of a body fluid, comprising the steps of supporting an inner tube within an outer tube having a closed lower end and containing a liquid diluent for said body fluid; said inner tube having an upper section with an enlarged chamber therein and having an elongated lower capillary section; said capillary section communicating at its upper end with said enlarged chamber and at its lower end with the interior of said outer tube; introducing into said chamber a measured quantity of body fluid containing different cellular components; initially centrifuging the assembled inner and outer tubes until the effectively larger cellular components have migrated from said inner tube into the lower end of said outer tube and the effectively smaller cellular components are disposed substantially entirely within said capillary section; then interrupting centrifugation; separating said inner tube from said outer tube; sealing the lower end of said capillary section; separating said capillary section from said upper section; and thereafter recentrifuging only said capillary section at relatively high speed to stratify and pack the harvested cellular components contained therein.

17. The method of claim 16 in which there is the further step of determining the packed volume of the cellular components in said capillary section by measuring the lengths of the packed cell columns of different cellular components contained therein.

18. The method of claim 16 in which said body fluid is whole blood and said effectively larger cellular components are erythrocytes.

19. The method of claim 18 in which said diluent is an aqueous fluid compatible with whole blood.

* * * * *